United States Patent [19]

Altomare et al.

[11] 4,431,677

[45] Feb. 14, 1984

[54] PROCESS FOR PRODUCING A PINEAPPLE CORE BULKING AGENT

[75] Inventors: Robert E. Altomare, Yonkers; Robert J. Beale, New Rochelle, both of N.Y.; Adolph S. Clausi, Cos Cob, Conn.; William R. Romig, Yorktown Heights, N.Y.

[73] Assignee: General Foods Corporation, White Plains, N.Y.

[21] Appl. No.: 355,407

[22] Filed: Mar. 8, 1982

[51] Int. Cl.[3] .......................... A23B 7/06; A23L 1/27

[52] U.S. Cl. .................................. 426/257; 426/428; 426/478; 426/615; 426/640; 426/804

[58] Field of Search .............. 426/615, 428, 429, 431, 426/478, 481, 640, 257, 253, 804, 539, 534

[56] References Cited

U.S. PATENT DOCUMENTS 1,166,674 1/1916 Gould et al. ........................ 426/655
2,118,405 5/1938 Karas ................................. 426/640

FOREIGN PATENT DOCUMENTS 130953 11/1977 Japan .

*Primary Examiner*—Raymond N. Jones
*Assistant Examiner*—George C. Yeung
*Attorney, Agent, or Firm*—Thomas A. Marcoux; Thomas R. Savoie; Daniel J. Donovan

[57] ABSTRACT

The invention relates to a process for producing a pineapple core bulking agent comprising coarsely grinding or slicing pineapple core to obtain particles or slices of ¼ inch or less, water-washing to remove soluble carbohydrates, contacting with alcohol to remove colors and flavor constituents, removing water and alcohol, and finally milling to the consistency of flour. The pineapple core bulking agent obtained from this process is especially useful as a partial replacement for high-caloric ingredients such as flour, fat and/or sugar to prepare a food product with at least a one-third reduction in calories, more preferably from 50% to 75% or higher. The pineapple core bulking agent has a high water binding capacity of from 10 to 30 grams of water per 1 gram of pineapple core bulking agent.

12 Claims, No Drawings

PROCESS FOR PRODUCING A PINEAPPLE CORE BULKING AGENT

TECHNICAL FIELD

This invention relates to a process for producing a bulking agent from pineapple core which can be used to partially replace high-caloric ingredients, such as flour, fat and/or sugar, to prepare a food product with at least a one-third reduction in calories, more preferably from 50% to 75% or higher. Also, the pineapple core bulking agent is useful as a source of fiber to be incorporated into a food product.

BACKGROUND ART

There is increasing interest in foodstuffs having a reduced caloric content, and especially in low-calorie, baked goods. Such baked goods are desirable for reducing body weight in persons who are obese, without using appetite suppressants, and also for preventing unwanted weight gain in normal persons. One approach to reducing the caloric value of baked goods has been to replace part of the flour or other carbohydrate components (e.g., sugar or starch) with agents which are substantially non-digestable, and hence low in calories. For example, various forms of purified plant cellulose, such as alpha-cellulose sold under the tradename "Solka-Floc," and microcrysatlline cellulose sold under the tradename "Avicel," have been proposed as partial flour substitutes.

When these conventional cellulose materials are used as a bulking agent in a food recipe, the final food product is not smooth, has a gritty mouthfeel when chewed, gives the impression of the presence of an additional insoluble or residual substance, and tends to accumulate in the mouth. Soluble cellulose derivatives has also been used as bulking agents but tend to form unpalatable, gummy masses in the mouth. It is generally agreed, however, that calorie reduction of as high as 33% to 75% in baked goods is extremely desirable, and heretofore it has not been possible to achieve these calorie reduction levels by the use of cellulosic flour replacement alone to produce a high quality product.

Pineapple core, the starting material for the low-calorie bulking agent of this invention, has generally been considered as a waste material. Pineapple core is currently recombined with the shells or husks of the pineapple and used as cattle feed. Japanese Early-Disclosure Patent No. 130953/1977 entitled Starchy Foods discloses the addition of pineapple pulp to baked cakes, breads or noodles. The addition of pineapple pulp serves to raise the level of fiber in the resulting foodstuff. There is a need in the food art for the production of a low-calorie bulking agent from pineapple core which is substantially flavorless and colorless and which could be used as a partial replacement for high-caloric constituents.

DISCLOSURE OF THE INVENTION

The present invention discloses a process for producing a pineapple core bulking agent which is bland, decolorized and non-caloric and which can be incorporated into food products at levels of from 0.1 to 60% by weight dry basis, as a partial replacement for high-caloric ingredients, such as flour, fat and/or sugar. The product of this invention is especially useful in formulating a food product with at least a one-third reduction in calories, more preferably from 50–75% or more. The caloric reduction results from either the high water binding capacity of the pineapple core bulking agent or from dilution of high caloric ingredients in foodstuffs or a combination of the two. The product of the present invention is also a good source of fiber which may be incorporated into a foodstuff, particularly a cereal product.

The pineapple core bulking agent produced according to the present invention is only a partial replacement for high-caloric constituents such as flour. So, for example, if a certain quantity of flour is to be replaced, a combination of pineapple core bulking agent, wheat gluten and egg white solids can be substituted.

The process of producing the pineapple core bulking agent of this invention involves coarsely grinding or slicing up the pineapple core, water-washing to remove substantially all of the soluble carbohydrates, contacting with alcohol to extract color and flavor constituents, removing alcohol and water from the pineapple slices or particles, and grinding the processed slices or particles to a flour consistency.

The source material for the new product of this invention is pineapple core. Pineapple core is a waste by-product of the pineapple canning industry and, as such, it is available in large quantities. The pineapple core is coarsely ground or sliced to reduce the particle size in order to facilitate the extraction process. The rate of extraction is inversely related to the slice or particle size thickness. The pineapple core particles or slices after being coarsely ground should be ¼ inch or less in thickness, preferably less than ⅛ inch. Slicing is preferable as grinding causes excessive fines which hamper the extraction process.

The pineapple core slices or coarsely ground particles are water-washed to remove a majority of the soluble carbohydrates. Preferably greater than 75% of the soluble carbohydrates are removed during the water-washing, more preferably greater than 95%. The completely processed, dried pineapple core bulking agent produced in accordance with the invention will contain less than 1% soluble carbohydrates preferably less than 0.5%. The majority of soluble carbohydrates are removed during the water-washing step, however some carbohydrates are removed during the alcoholic extraction of color and flavor constituents.

To maximize the removal of soluble carbohydrates, two or more water-washes are preferable. However, the increased water content which is attributable to duplicate water-washes will decrease the efficiency of the color removal. After water-washing it is preferable to dewater the water-washed pineapple core particles or slices in order to facilitate alcoholic removal of color and flavor constituents. Dewatering procedures include screw pressing, centrifugation, sieving, and alcoholic dehydration. These procedures are well known to those skilled in the art.

Suitable alcoholic solutions to accomplish the removal of bitter constituents and colors from the pineapple core include methanol, ethanol or isopropanol (IPA) in combination with water. Other solvents which have been shown to remove bitter constituents and color include tertiary butyl alcohol, ethylene glycol mono methyl ether, 2-methyl ethyl ether and hexane. However, these solvents are not as preferred as the aforementioned alcoholic solutions.

The preferable alcoholic solution is an isopropanol concentration greater than 70 weight percent. 100%

IPA can be used successfully yielding a dried product that has an extremely low bulk density. The preferred concentration of IPA is 70–80 weight percent if the pineapple core material is to be vacuum dried to low IPA residual levels in a single stage. It is difficult to vacuum dry 87% or greater IPA treated pineapple core material to low IPA residual levels in a single step. In order to maximize color removal from the pineapple core material, countercurrent extraction is recommended because the most extracted material comes in contact with the freshest solvent. Since the pineapple core material is very porous, it is desirable to minimize the chances of it retaining color-laden alcohol within its structure. Other processes to accomplish the alcoholic removal of color include batch extraction and single column leaching. These procedures are well known to the skilled artisan.

Alternatively, the slices or coarse particles of pineapple core could be extensively water-washed to accomplish not only the removal of soluble carbohydrates but also some removal of color and flavor. However, the bulking material obtained after water-washing alone will be more likely to possess and/or develop flavor problems which are generally due to the carotenoid component. The development of off-flavors may be reduced by the introduction of an antioxidant.

The removal of alcohol poses a difficult problem. There are different methods to maximize the removal of alcohol after color removal has been accomplished. The first alternative involves the utilization of a IPA/water solution of 78% or less followed by vacuum drying. While this concentration will assure maximum alcohol removal from the pineapple core material, this low concentration does not produce the most optimal color and flavor removal. Another alternative involves utilizing a higher IPA/water concentration and a two phased approach of first removing alcohol and then drying the particles or slices.

Moisture is necessary in the pineapple core material to allow for the escape of alcohol. If the material is allowed to dry without first removing the alcohol, alcohol will be fixed within the structure and it will be extremely difficult to remove from the dry material. When the surface dries out and case hardens, any IPA present in the pineapple core slice or particle will be entrapped. Since most alcohol should be removed before water is driven off, water can be sprayed on the pineapple core slices or particles to keep the material moist. A rewet/redry process can be utilized as well as fluid-bed-drying wherein water is sprayed on the pineapple material to keep the surface porous so alcohol will not be fixed within the structure of the pineapple core slice or particle. While the above specified methods are preferred, the pineapple core slices or particles could be spread out on trays and allowed to air-dry.

After the pineapple core material has been dried, it is preferably milled so as to produce the consistency of a flour, having an average particle size typically less than 100 microns, preferably less than 50 microns. This final reduction in particle size is critical to the functionality of the pineapple core bulking agent and its successful incorporation into a food product, especially if it is to be baked.

The pineapple core bulking agent produced in accordance with the present invention is bland and decolorized. Any detectable flavor has been removed during alcoholic extraction. The exact preferable particle size will depend largely upon which food application the pineapple core bulking agent will be put to. It contains less than 1% soluble carbohydrates, preferably less than 0.5%; less than 1000 ppm residual alcohol, preferably less than 250 ppm, most preferably zero. Greater than 95% of the coloration (determined by colorimetric assay) has been removed from the pineapple core bulking agent particles.

The pineapple core bulking agent is a non-caloric ingredient. The term non-caloric means that pineapple core bulking agent contains 0 calories per gram. The caloric availability was measured by a bioassary technique relating animal growth to calories supplied. Specifically this was done by comparing the growth of animals eating a basal diet plus the pineapple core bulking agent to the growth of animals eating the basal diet plus an appropriate standard, in this case sucrose. (For further information on this bioassary technique see Staub, H. W., Caloric Availability of Dietary Polyols, Fed. Proc. 37, 678. 18978; and Staub, H. W. and Ali, R. Chapter 4 Nutritional and Physiological Value of Gums in Food Hydrocolloids edited by Glicksman, M. CRC Press, Boca Raton, Fla., 1982. 1)

The pineapple core bulking agent contains within the range of from 70% to 90% Neutral Detergent Residue (NDR) or dietary fiber and within the range of from 50% to 65% crude fiber. The NDR or cell wall material in the detergent system of fiber analysis represents dietary fiber, consisting of the hemicelluloses, celluloses and lignin with perhaps some fiber bound protein. Other broader definitions of dietary fiber include unavailable storage polysaccharides, pectinaceous substances, gum, mucilages and modified polysaccharides. Certain other substances intimately associated with the plant cell wall such as small amounts of nonlignin phenols, cutin, phytic acid and some minerals are included in some definitions of dietary fiber. The polysaccharides associated with dietary fiber are not digested by mammalian digestive enzymes but are fermented in man by the colonic microflora.

Those skilled in the art will appreciate that the term dietary fiber is an indefinite one which has several meanings depending upon the method of assay among other variables. To remove this uncertainty the definition of NDR in this application will be as defined by the method of Goering and Van Soest (Agr. Handbook No. 379, A.R.S. USDA Washington, D.C., 1970) as modified and discussed by Robertson (Chapter 1. The detergent system of fiber analysis in *Topics in Dietary Fiber Research* edited by G. A. Spiller and R. J. Amen, Plenum Press N.Y. 1978).

Crude fiber is loss on ignition of dried residue remaining after digestion of sample with 1.25% sulfuric acid and 1.25% sodium hydroxide under specific conditions. Typical conditions and methodology are described in the Officials Methods of Analysis of the Association of Official Analytical Chemists.

The pineapple core bulking agent contains within the range of from 3% to 10% total pectin. The pineapple core bulking agent contains within the range of from 30% to 40% cellulose, from 25% to 35% hemicellulose and from 15% to 25% lignin. The pineapple core bulking agent contains within the range of from 1% to 5% ash and within the range of from 2% to 8% protein. The moisture content of the pineapple core bulking agent is less than 10%. The bulk density of the pineapple core bulking agent is within the range of from 0.01 to 0.5 g./cc.

The pineapple core bulking agent has a water holding capacity of from 10 to 30 grams of water per 1 gram of the pineapple core bulking agent. The water binding capacity of the pineapple core bulking agent was determined analytically as being the weight of water retained in a pellet formed by centrifuging a slurry of pineapple core bulking agent in excess water. It is hypothesized that the pineapple core bulking agent binds water differently than other bulk fillers and this property is reflected in the increased functionality of the material in baked products. Pineapple core contains a relatively low concentration of pectin and a high concentration of cellulose, hemicellulose and lignin. Moisture appears to be more tightly bound as is evidenced by Nuclear Magnetic Resonance data.

The invention is illustrated, but not limited, by the following specific examples of the method of preparation of the pineapple core bulking agent and its incorporation into a food product. It will be recognized that various additional modifications can be made without deviating from the scope of the invention.

EXAMPLE 1

Pineapple cores, the starting material for the process of the present invention, are collected as waste material from the canned pineapple industry.

Frozen cores were partially thawed and sliced with a Hallde Food Processor using a 1.5 mm standard, 3-blade slicer insert at high speed. To maximize the removal of soluble carbohydrates the slices were washed with 70° F. (approx. 21° C.) water in two stages at a 5:1 water to solids ratio. The pulp was drained after the first wash and centrifuged after the second. The washed pulp was dewatered and partially extracted in 87 weight percent IPA for 12–24 hours at a alcohol to centrifuged solids ratio of 2:1.

The alcohol soaked pulp was drained and charged to a 4 inch diameter by 20 foot tall column where it was contacted with 87 weight percent IPA at a flow rate of 700 ml./min. at 140° F. (approx. 60° C.) inlet temperature. Contact time was 3.0 hours in an upflow direction. Extracted solids were discharged, drained and then dried. Drying was accomplished in a fluid-bed-dryer at 40° C. for 2½ hours followed by 60° C. for ½ hour. To achieve a low residual IPA level the dried pineapple cores were ground through a 0.063" screen on a Homoloid mill, moisturized with 35% by weight distilled deionized water and vacuum dried at 120° F. (approx. 49° C.) and 26" Hq vacuum.

The now desolventized core material was further reduced in size with a Mikropul Inc. mill model 10 ACM such that 90% of the blend passed through a 200 mesh sieve or was finer than 75 micions.

The above process produces a material containing less than 50 ppm residual alcohol and less than 2% of the initial pigment as determined by colorimeteric assay. The pineapple core bulking agent contained 3.7% ash, 3.5% moisture, 3.6% protein and less than 0.1% soluble carbohydrates.

EXAMPLE 2

Pineapple cores, the starting material for the process of the present invention, are collected as waste material from the canned pineapple industry. The frozen cores are sliced in a Comitrol 3600 with a 0.5 inch plate.

To maximize the removal of soluble carbohydrates 70° F. (approx. 21° C.) water of a ratio of 5:1 water to pineapple core is used to wash the coarsely ground material for 30 minutes. This is repeated until soluble solids content is minimized to 0.1% as determined by a refractometer.

The material is then dewatered using centrifugation following each water wash and dehydrated in 100% isopropyl alcohol for 10 minutes at 1.5 times the net weight of the pineapple core.

87 weight percent IPA is then used to extract the color and flavor from the pineapple core to produce a bland white material. The extraction is carried out as batch or column extraction with 87% IPA. The amount of IPA added is approximately five times the solids weight at 25° C.

The extracted material is then vacuum-dried at 25–27 inches of mercury and 140° F. (approx. 60° C.) for 24 hours. In order to achieve IPA levels under 500 ppm. it was necessary to rewet and redry the vacuum dried pineapple core bulking agent particles. Once dried, the particles are milled to an average particle size less than 100 microns.

The above process produces a non-caloric ingredient containing 0 calories/gram as determined by bioassay. It contains less than 1% soluble carbohydrate, less than 500 ppm residual alcohol. More than 95% of the color has been removed, and any detectable flavor has been removed by the alcohol. The pineapple bulking agent contains 6.4% pectin, 88.3% neutral detergent fiber, 59.5% crude fiber, 1.2% ash, 3% protein, and 4.3% moisture. The material has a bulk density of 0.17 gram/cc, and a water-holding capacity of 14.1 grams of water per 1 gram of pineapple core bulking agent.

EXAMPLE 3

The pineapple core bulking agent produced in Example 1 was incorporated into the following formulation to produce a 48% calorie reduced white cake.

| Ingredient | Grams |
|---|---|
| Water | 310 |
| Cake Flour | 100 |
| Sugar | 90 |
| Pineapple Core Bulking Agent | 16 |
| Shortening (Durlo-Durkee) | 20 |
| Egg White | 30 |
| Sodium Bicarbonate | 6 |
| Sodium Aluminum Phosphate (Levair-Stauffer Chem. Co.) | 6 |
| Instant Nonfat Milk Solids | 5 |
| Sodium Stearyl-2-lactylate (Emplex-Patco) | 4 |
| Salt | 1 |
| Polyoxyethelene (20) sorbitan mono-oleate (Tween 80-ICI Americas, Inc.) | 1 |
| Vanillin | 0.1 |
| | 589.1 |

Sugar and shortening were creamed together. Flour, egg white, salt, pineapple core bulking agent, vanillin, sodium bicarbonate, Levair, milk solids and Emplex were dry blended and added to the creamed sugar in small portions while mixing well. This dry mix was then sifted twice. Tween 80 was dispersed in water and added while mixing at high speed for 3 minutes. The batter was poured into a lined and oiled cake pan, (8" in diameter) and baked at 350° F. (approximately 177° C.) to give a 7.8% bake loss. This yielded a 47.5 calorie-reduced cake containing 2.0 calories/gram compared to a control white cake with 3.8 calories/gram (U.S.D.A. Handbook #8).

We claim:

1. A process for producing a pineapple core bulking agent which comprises:

(a) coarsely grinding pineapple cores to obtain particles or slices of pineapple core less than ¼ inch in thickness;

(b) washing the pineapple core particles or slices with water to remove a majority of soluble carbohydrates;

(c) contacting the water-washed pineapple core particles or slices with an alcoholic solution; and (d) removing water and alcohol from said pineapple particles or slices to produce a bland, decolorized pineapple core bulking agent.

2. A process according to claim 1 which further comprises removing water from the water-washed pineapple core particles or slices by a dewatering procedure 3. A process according to claim 2 wherein the dewatering procedure consists of screw pressing, centrifugation, alcoholic dehydration or sieving.

4. A process according to claim 1 wherein the alocholic solution is selected from the group consisting of isopropanol, methanol and ethanol.

5. A process according to claim 4 wherein the alcoholic solution is isopropanol.

6. A process according to claim 5 wherein the isopropanol is of a concentration greater than 70 weight percent.

7. A process according to claim 1 wherein the contacting of the water-washed pineapple core particles or slices with the alcoholic solution is accomplished by continuous countercurrent extraction, batch extraction or single column leaching.

8. A process according to claim 1 wherein the removal of alcohol and water from the pineapple core particles or slices is accomplished by vacuum-drying, fluid-bed-drying or air-tray-drying.

9. A process according to claim 1 further comprising the step of finely comminuting the pineapple core bulking agent.

10. The process according to claim 9 wherein the finely comminuted pineapple core bulking agent is of an average particle size of 100 microns or less.

11. The process according to claim 9 wherein the finely comminuted pineapple core bulking agent is of an average particle size of 50 microns or less.

12. The process according to claim 1 wherein said pineapple core bulking agent is non-caloric.

* * * * *